United States Patent
Riester

(10) Patent No.: US 9,636,756 B2
(45) Date of Patent: May 2, 2017

(54) MULTI-LIP DRILLING TOOL WITH INTERNAL COOLING DUCTS

(71) Applicant: Gühring KG, Albstadt (DE)

(72) Inventor: Christine Riester, Sigmaringen (DE)

(73) Assignee: Guehring KG, Albstadt (DE)

( * ) Notice: Subject to any disclaimer, the term of this patent is extended or adjusted under 35 U.S.C. 154(b) by 70 days.

(21) Appl. No.: 14/847,471

(22) Filed: Sep. 8, 2015

(65) Prior Publication Data
US 2016/0059323 A1    Mar. 3, 2016

Related U.S. Application Data

(63) Continuation of application No. PCT/EP2014/055739, filed on Mar. 21, 2014.

(30) Foreign Application Priority Data

Mar. 21, 2013 (DE) .......... 10 2013 205 056

(51) Int. Cl.
*B23B 51/06* (2006.01)

(52) U.S. Cl.
CPC .......... *B23B 51/06* (2013.01); *B23B 2250/12* (2013.01); *Y10T 408/455* (2015.01)

(58) Field of Classification Search
CPC .. B23B 51/06; B23B 2250/12; Y10T 408/455
See application file for complete search history.

(56) References Cited

U.S. PATENT DOCUMENTS

| 4,826,364 | A | * | 5/1989 | Grunsky | ................. B23B 51/06 408/230 |
| 9,216,460 | B2 | * | 12/2015 | Matsuda | ................. B23B 51/06 |
| 2006/0006576 | A1 | * | 1/2006 | Karos | ................. B21C 23/147 264/209.2 |
| 2012/0082524 | A1 | | 4/2012 | Matsuda et al. | |

(Continued)

FOREIGN PATENT DOCUMENTS

| DE | 10 2009 024 256 | 12/2010 |
| EP | 2 444 185 | 4/2012 |

(Continued)

OTHER PUBLICATIONS

International Search Report (and translation) from a corresponding international patent application bearing a mailing date of Jun. 13, 2014, 4 pages.

*Primary Examiner* — Daniel Howell
(74) *Attorney, Agent, or Firm* — Burr & Brown, PLLC

(57) ABSTRACT

A multi-lip drilling tool is described, in which main cutting edge transitions in the region of the drill into a center lip section, wherein a cooling duct that leads to the drill tip is formed in each drill web. The invention minimizes tensile stress spikes in the chip flute base, while at the same time ensuring that a hitherto unachievable coolant/lubricant quantity gets to the engaged main blade. This is ensured by selecting a duct cross sectional form similar to an unsymmetrical kidney, in which it is ensured the selected radii of curvature for the individual boundary curve sections causes as much coolant/lubricant as possible to arrive at the blade or in proximity thereto in the fastest way via the point thinning and its edges intersecting with drill core.

14 Claims, 3 Drawing Sheets

(56) References Cited

U.S. PATENT DOCUMENTS

2015/0321267 A1* 11/2015 Takai .................. B23B 51/06
 408/59
2016/0031016 A1* 2/2016 Takai .................. B23B 51/06
 408/57

FOREIGN PATENT DOCUMENTS

| JP | S63-216611 | 9/1988 |
| WO | 2011-132686 | 10/2011 |

* cited by examiner

MULTI-LIP DRILLING TOOL WITH INTERNAL COOLING DUCTS

The invention relates to a multi-tip drilling tool with internal cooling ducts according to the preamble to claim 1.

Such a drilling tool is described in WO 2004/056519 A2, for example. Known in particular from this document is to optimize a cooling duct geometry in such a way that the best possible compromise can be achieved between the coolant throughput, breaking, compressive, torsional and bending strength of the tool.

Just as the cross sectional forms according to DE 199 42 966 A1, DE 36 29 035 A1 or CH 26 52 62, the cross sections for the internal cooling ducts used in a generic tool according to WO 2004/056519 A2 can be characterized as being bounded by a contour that is continuously convex in the same direction.

As generic drilling tools are further developed into high-performance tools, the size accuracy and surface quality of which the manufacturer in the interim must guarantee for the entire service life, meaning for the entire required machining path, it is necessary that the tool be largely relieved at all crucial points, i.e., trouble spots with respect to thermal and mechanical loads. This relates to the engaging blades on the one hand, but also to other areas of the tool, which are exposed to a special wear or a special mechanical or thermal load in the machining process.

Therefore, the object of the present invention is to provide a multi-lip drilling tool, in particular a multi-lip drilling tool for drilling into solid materials, in which the risk of local excessive thermal and mechanical loads is further diminished.

This object is achieved by the features in claim 1.

The many years of extensive tests performed by the applicant on cooling duct cross sectional contours of varying kinds have shown that a cooling channel cross section with the characteristics of claim 1 is far superior to all conventional cross sectional forms of cooling duct cross sections, specifically as concerns both the distribution of stresses in the drill and the thermal load on the critical drilling tool regions. In particular, it was found that the cross sectional form according to the invention minimizes tensile stress spikes in the chip flute base, while at the same time ensuring that a hitherto unachievable coolant/lubricant quantity gets to the engaged main blade with point thinning or to the chips arising there. This is ensured primarily by selecting a cross sectional form similar to an unsymmetrical kidney, in which it is ensured that the selected radii of curvature for the individual boundary curve sections causes as much coolant/lubricant as possible to arrive at the main blade or in proximity thereto in the fastest way via the point thinning and its edges intersecting with the drill core. The tool volume exposed to the peak stresses is minimized by providing a cross sectional contour portion with a concave curve, which lies behind the main blade. In this way, more material can be concentrated behind the main blade than would be possible with conventional constructions or configurations of the internal cooling ducts. As a result, the geometry of the internal cooling ducts according to the invention is especially suitable for tools that also consist of high-strength material, e.g., carbide (solid carbide VHM) or a cermet material.

This is because these materials have a lower impact and permanent bending fatigue strength by comparison to other, more ductile materials.

Advantageous further developments are the subject of the subclaims.

In the further development of claim 3, the unsymmetrical kidney form of the cross section becomes even more pronounced, with the effect of forcing back the stress peaks in the chip flute base to an even more constricted range. In addition, the concave curve section of the cross sectional contour here makes it possible to effectively enlarge the wall thickness of the drill web between the main blade and internal cooling duct.

Due to the inventive configuration of the cross section of the internal cooling duct, the necessary central angle over which the cooling duct extends in the drill web can be limited to a relatively narrow range of between 30 and 40°, without having to supply a minimum quantity of coolant/lubricant to the drill bit.

In particular when using a coolant/lubricant supply according to MMS (minimum quantity lubrication) technology with coolant/lubricant supply pressures within the conventional range of 20 to 60 bar, it was found to be easily sufficient for the cooling duct in the drill web to extend in the radial direction over a region according to claim 5, which further benefits the tool strength.

The values for the configuration of the individual contour sections of the cooling duct envelope ends can generally still be optimized further in terms of how the point thinning of the drill core is designed and/or dimensioned. Regions within the framework of which the average expert can optimize the cross sectional contour qualitatively prescribed by claim 1 are indicated accordingly for the geometric parameters to circumscribe the cooling duct cross section.

An exemplary embodiment of the invention will be explained in more detail below based on schematic drawings. Shown on:

Figure 1:
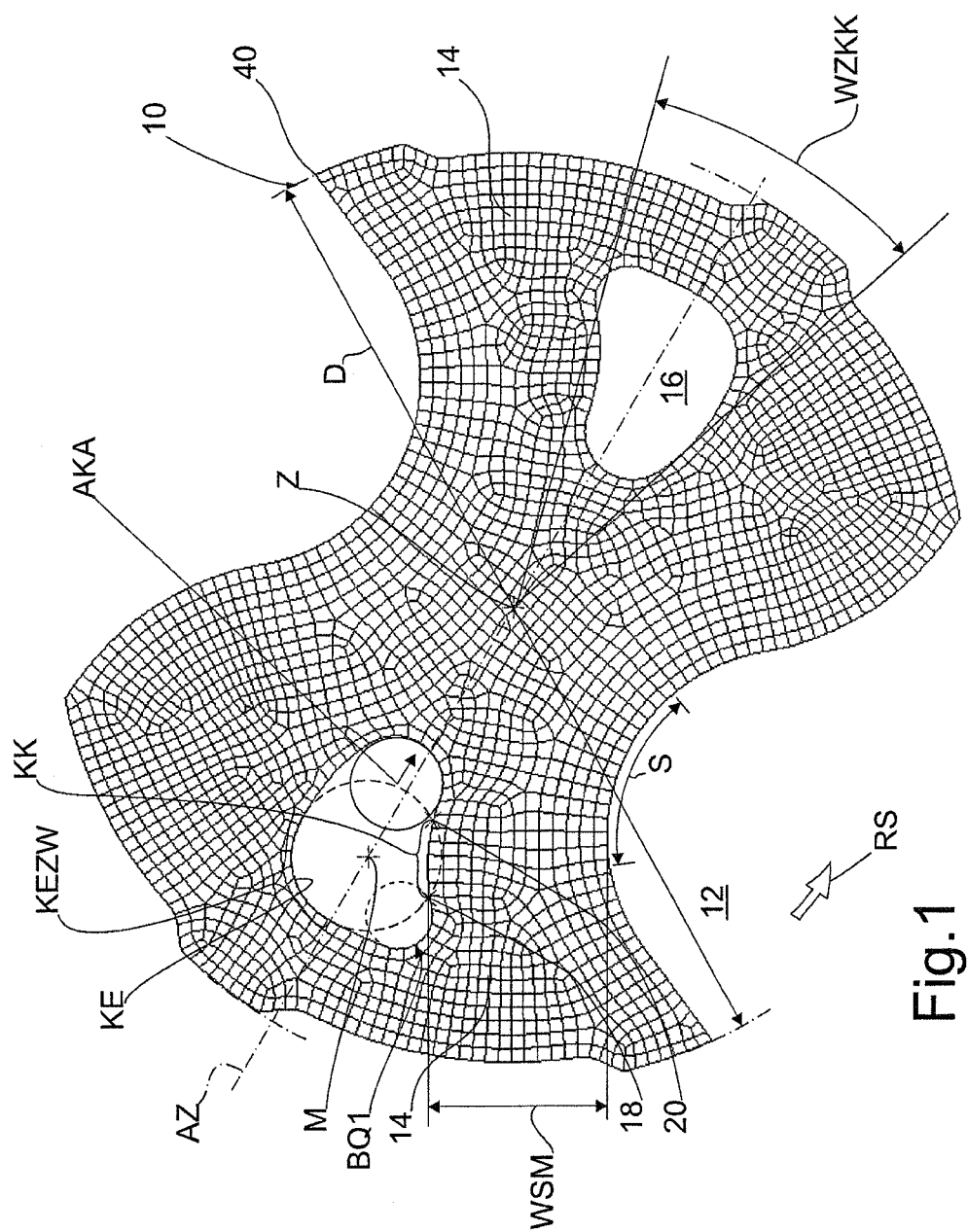
FIG. 1 is a magnified section through a two-lip drilling tool with internal cooling ducts for explaining the form and position of the cooling duct cross sectional contour according to the invention.

FIG. 1 shows the cross section of a two-lip drilling tool 10 with chip flutes 12 and drill webs 14. The drilling tool 10 can be a straight fluted or helically fluted drilling tool.

The drill webs 14 incorporate internal cooling ducts 16 with a special cross section, which will be described in more detail further below. These internal cooling ducts are introduced into the drill body in a shaping method, e.g., specifically in an extrusion method as described in DE 42 42 336 A1. According to this method, blanks can be efficiently manufactured for solid carbide drilling tools with internal cooling ducts, wherein the cross sectional form of these cooling ducts is selected by using a corresponding cross section of the pin held on a nozzle mandrel. The disclosure in DE 42 336 A1 is expressly included in the present application with respect to the manufacturing process. However, it is just as possible to fabricate the cross sectional contour using a different method, such as the one described in U.S. Pat. No. 2,422,994, DE-PS 36 01 385, EP 0 465 946 A1 or EP 0 431 681 A2.

The cross sectional contour of the internal cooling ducts 16 is distinguished by the following characteristics:

The cross sectional contour essentially has the cross sectional form of an unsymmetrical kidney. A largest circle KE essentially completely inscribed in the cooling duct cross section overlaps the center of the drill webs 14. According to FIG. 1, this happens when the central axis AZ (see drilling tool center Z), which runs essentially through the center of the drill webs 14, also passes through the center of the inscribed largest circle KE.

In addition, this inscribed largest circle KE bounds the contour of the cooling duct cross section via a central angle WZKE in a range of between 80 and 90° in a radially external region facing away from the rotational direction RS (see FIG. 1). The corresponding contour section is marked KEZW.

Figure 2:
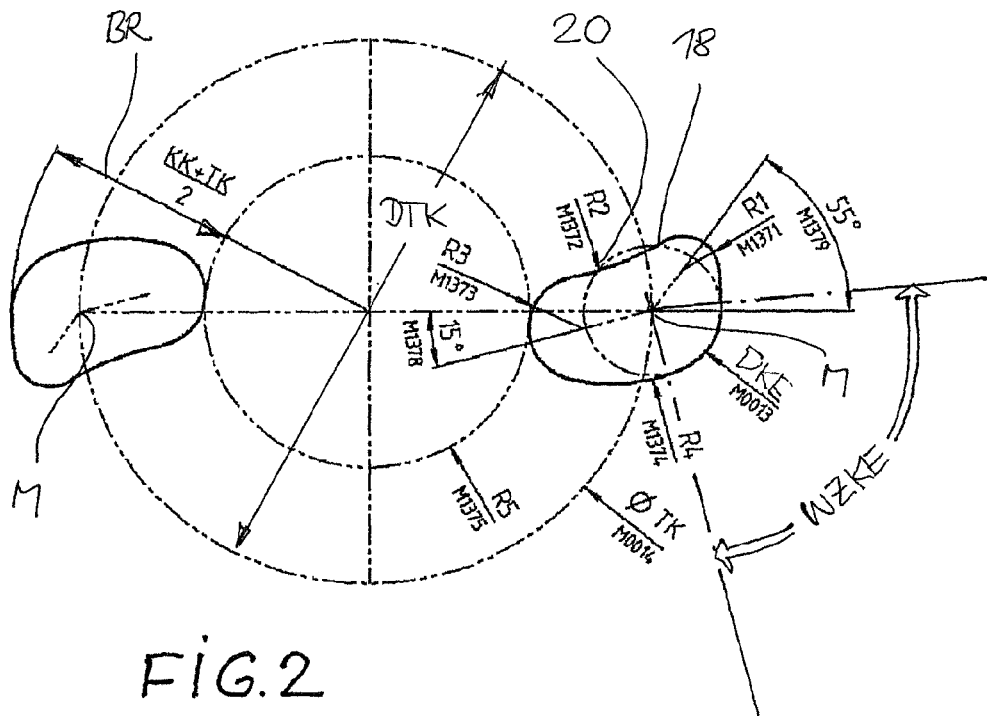
FIG. 2 is a schematic depiction to explain the dimensioning and alignment of the internal cooling ducts in a solid carbide (VHM) drilling tool.

Radially externally and in the cutting direction, the boundary curve KEZW defined by the inscribed circle KE is adjoined essentially in the circumferential direction by a cross sectional contour section BQ1, whose radius of curvature R1 has the same direction as, but is significantly smaller than, the inscribed circle KE (see FIG. 2).

As evident from FIG. 1 and FIG. 2, this smaller radius of curvature R1 of the cross sectional contour section BQ1 transitions into a concave curve KK with a radius of curvature R2 (see FIG. 2) that is many times larger than the curvature of the inscribed largest circle KE.

Radially internally and outside the inscribed largest circle KK (see FIGS. 1 and 2), the concave curve KK is once again adjoined by a convex duct bulging section AKA with a radius of curvature R3 (see FIG. 2) that is significantly larger than the small radius of curvature R1 in the cross sectional contour section BQ1. Finally, as may be gleaned from FIGS. 1 and 2, the curvature of the cross sectional boundary continuously increases from the bulging section AKA to the region KEZW.

As further evident from FIGS. 1 and 2, the largest circle KE essentially inscribed in the cooling duct cross section in the embodiment shown lies essentially in the center of the drill webs 14. However, this configuration is not obligatory. Depending on the configuration of the point grinding, in particular as a function of the form, size, position and expansion of a point thinning in the drill cutting area, the internal cooling ducts can also be displaced in the circumferential direction. In each case, however, the largest circle KE essentially inscribed in the cooling duct cross section should overlap with the center of the drill webs 14.

As may also be gleaned from FIGS. 1 and 2, the largest circle KE essentially inscribed in the cooling duct cross section intersects the concave curve KK at two points 18 and 20. As most evident from FIG. 1, this yields a minimum wall thickness WSM between the chip flute or main blade and internal cooling duct 16 that is considerably enlarged by comparison to conventional cooling duct cross sectional geometries. The positive effect of this is that the section S (see FIG. 1) subjected to an elevated tensile stress while exposing the drilling tool to a torsional load can be limited by comparison to prior art.

WZKK on FIG. 1 denotes a central angle over which the cooling duct 16 extends. According to the invention, this central angle WZKK lies between 30 and 40°.

As evident from FIG. 2, the cooling duct 16 in the drill web extends in a radial direction over an area BR ranging between 0.15 and 0.2×D, wherein D denotes the nominal diameter of the drilling tool.

The central point M of the largest inscribed circle KE lies on a semicircle having a diameter DTK (see FIG. 2) within a range of 0.5×D.

DKE on FIG. 2 denotes the diameter of the inscribed largest circle KE. According to the invention, the latter ranges between 0.1 and 0.15×D.

The smaller radius of curvature R1 (see FIG. 2) of the cross sectional contour section BQ1 has a value essentially corresponding to 0.25 times the diameter DKE of the inscribed largest circle KE.

The radius of curvature R2 of the concave curve KK (see FIG. 2) essentially corresponds to twice the value of the diameter DKE of the inscribed largest circle KE.

The radius of curvature R3 of the convex duct bulging section AKA essentially corresponds to 1.5 times the smallest radius of curvature R1 in the cross sectional contour section BQ1.

As a result of this contour for the cross section of the internal cooling duct 16 as geometrically outlined based on FIGS. 1 and 2, blade cooling can be maximized while at the same time minimizing the drill body volume exposed to tensile stress at a prescribed throughput volume of coolant/lubricant through the internal cooling ducts. This effect is especially advantageous in particular when the drilling tool or cutting edge of the drilling tool is made out of a material having a high strength but simultaneously a concomitant higher brittleness, as is the case for hard materials, such as solid carbide or cermet materials. Specifically, the effects are as follows:

The cross sectional contour section BQ1 extending with a comparatively small radius in the circumferential direction enlarges the cross sectional surface of the cooling duct 16, but without tangibly weakening the drill cross section. This is because small radii of curvature only exert a greatly weakened influence on the progression of stress in the radially external area. The wall thickness behind the main blade is enlarged over the concave section, which benefits the distribution of stress in the drill cross section. The radially internal bulging section AKA adjoining the concave section KK ensures that an elevated percentage of the lubricant/coolant can be diverted toward the chisel edge and main blade, so that the chips arising there can be cooled especially effectively. It was found that first and foremost cooling the chips is what protects the blades against excessive thermal loads.

Figure 3:
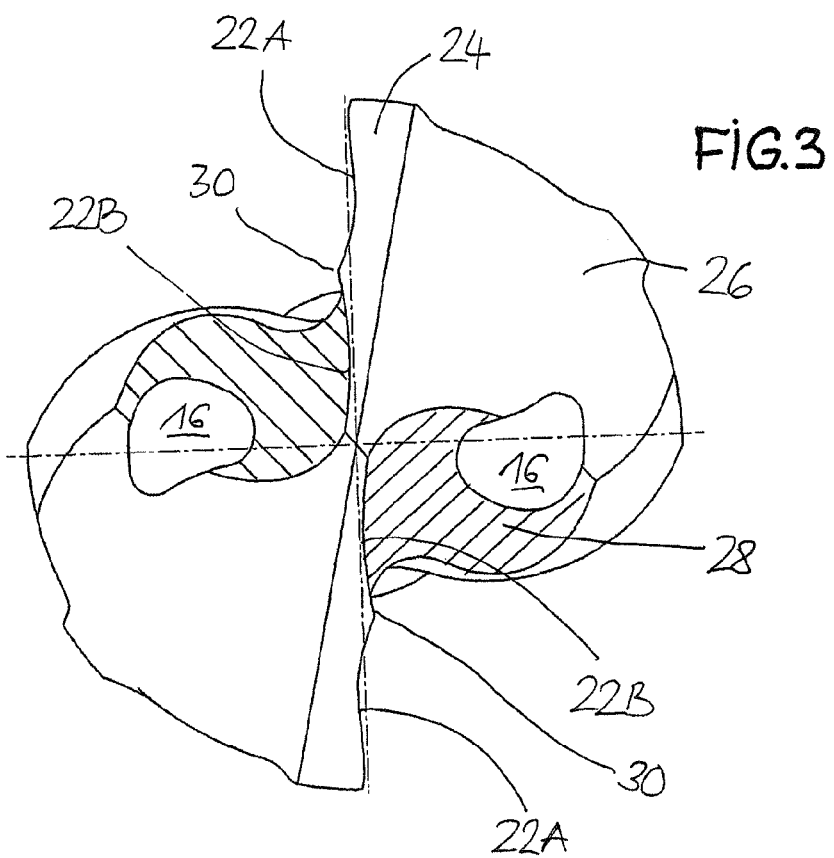
FIG. 3 is a front view of a multi-lip drilling tool, which is equipped with internal cooling ducts having a geometry according to the invention and a point grinding configured as a 4-facet point geometry.
Figure 4:
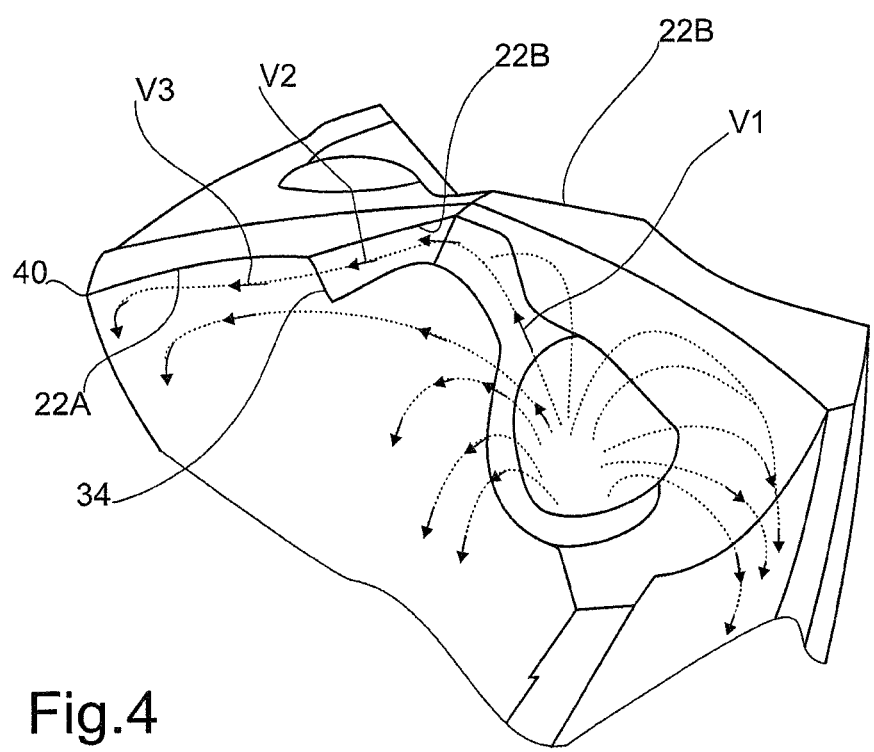
FIG. 4 is a perspective view of the bit of a multi-lip drilling tool according to the invention to illustrate the coolant/lubricant mass flows and velocities in the area of the drill bit.

There are advantages to configuring the cooling duct cross sections according to the invention in particular when using a point geometry according to FIGS. 3 and 4. FIG. 3 shows a top view of a tool according to the invention with a so-called 4-facet point geometry, in which a first and second free surface 24 and 26 lie behind the main blade 22 with sections 22A, extends from cutting edge corner 40, and 22B.

Reference number 28 denotes a point thinning marked with hatched lines on FIG. 3. The point thinning yields the area 22B of the main blade that is near the center. This area transitions into the radially external section 22A of the main blade by way of an inflection point.

The internal cooling ducts marked 16 are arranged in such a way as to empty partially into the free surface 26 and partially into a base of the point thinning 28.

As may be gleaned from FIG. 4, this configuration yields the following effect:

Dotted lines mark the current filaments of the coolant/lubricant exiting the cooling duct 16. The length of the arrows indicates the respective velocity at the respective positions of the cutting edge of the tool.

As evident, configuring the contour for the cross section of the internal cooling ducts 16 as described in the invention ensures the highest flow rates at locations where cooling the arising chips is especially important.

Specifically, FIG. 4 shows that flowing medium is guided to the cutting section 22B at a velocity V1, which is facilitated by the bulging section AKA of the cross sectional contour. In the area of an intersecting point 34 between the point thinning and drill core, velocity V1 increases to velocity V2, so that cooling is especially good in this area. Even in the area of the radially external main blade 22A, velocity V3 is still high enough to effectively draw in the chips arising there for cooling the tool.

Therefore, configuring the cooling duct cross section according to the invention is especially advantageous precisely in cases where a multi-lip drilling tool equipped therewith is fabricated out of a high-strength material, for example solid carbide or a cermet material, and where this tool is used to drill into solid material, in particular into materials having an especially heavy machinability.

As a consequence, the invention creates a multi-lip drilling tool with internal cooling ducts and point grinding with point thinning, in which a main cutting edge transitions into a central cutting edge section in the area of the drill web, wherein a duct guided to the drill bit is formed in each drill web. The cooling duct has the following characteristics as viewed in the cross section of the drill:

a) It has the cross sectional form of an unsymmetrical kidney, wherein b) the largest circle (KE) essentially inscribed in the cooling duct cross section overlaps with the center of the drill webs ( ) and bounds the contour of the cooling duct cross section via a central angle (WZKE) in a range of between 80 and 90° in a radially external region (KEZW) facing away from the rotational direction ( );

c) radially externally and in the cutting direction, the boundary curve (KEZW) defined by the inscribed circle (KE) is adjoined essentially in the circumferential direction by a cross sectional contour section (BQ1), whose radius of curvature (R1) has the same direction as, but is significantly smaller than, the inscribed circle (KE);

d) the smaller radius of curvature (R1) of the cross sectional contour section BQ1 transitions into a concave curve (KK) with a radius of curvature (R2) that is many times larger than the curvature of the inscribed largest circle (KE);

e) radially internally and outside the inscribed largest circle (KE), the concave curve (KK) is once again adjoined by a convex duct bulging section (AKA) with a radius of curvature (R3) that is significantly greater than the small radius of curvature (R1) in the cross sectional contour section (BQ1); and f) the curvature of the cross sectional boundary continuously increases from the bulging section (AKA) to the region KEZW.

The invention claimed is:

1. A multi-lip drilling tool with internal cooling ducts and point grinding with point thinning, in which a main cutting edge transitions into a central cutting edge section in the area of the drill core, wherein a cooling duct guided to the drill hit is formed in each drill web, and the cooling duct has the following characteristics as viewed in the cross section of the drill:

a) It has the cross sectional form of an unsymmetrical kidney, wherein b) the largest circle (KE) essentially inscribed in the cooling duct cross section overlaps with the center of the drill webs and bounds the contour of the cooling duct cross section via a central angle (WZKE) in a range of between 80 and 90° in a radially external region (KEZW) facing away from the rotational direction;

c) radially externally and in the cutting direction, the boundary curve (KEZW) defined by the inscribed circle (KE) is adjoined essentially in the circumferential direction by a cross sectional contour section (BQ1), whose radius of curvature (R1) has the same direction as, but is significantly smaller than, the inscribed circle (KE);

d) the smaller radius of curvature (R1) of the cross sectional contour section BQ1 transitions into a concave curve (KK) with a radius of curvature (R2) that is many times larger than the curvature of the inscribed largest circle (KE);

e) radially internally and outside the inscribed largest circle (KE), the concave curve (KK) is once again adjoined by a convex duct bulging section (AKA) with a radius of curvature (R3) that is significantly greater than the small radius of curvature (R1) in the cross sectional contour section (BQ1); and f) the curvature of the cross sectional boundary continuously increases from the bulging section (AKA) to the region KEZW.

2. The drilling tool according to claim 1, wherein the largest circle (KE) essentially inscribed in the cooling duct cross section lies essentially in the center of the drill webs.

3. The drilling tool according to claim 1, wherein the largest circle (KE) essentially inscribed in the cooling duct cross section intersects the concave curve (KK) at two points.

4. The drilling tool according to claim 1, wherein the cooling duct in the drill web extends over a central angle (WZKK) of between 30 and 40°.

5. The drilling tool according to one of claim 1, wherein the cooling duct in the drill web extends in a radial direction over an area (BR) ranging between 0.15 and 0.2×D, wherein D denotes the nominal diameter (DN) of the drilling tool.

6. The drilling tool according to claim 1, wherein the central point of the largest inscribed circle (KE) lies on a semicircle having a diameter (DTK) ranging between 0.45 to 0.55×D, wherein D denotes the nominal diameter (DN) of the drilling tool.

7. The drilling tool according to one of claim 1, wherein the diameter (DKE) of the inscribed largest circle (KE) ranges between 0.1 and 0.15×D, wherein D denotes the nominal diameter (DN) of the drilling tool.

8. The drilling tool according to of claim 1, wherein the smaller radius of curvature (R1) of the cross sectional contour section BQ1 has a value essentially corresponding to 0.25 times the diameter (DKE) of the inscribed largest circle (KE).

9. The drilling tool according to claim 1, wherein the radius of curvature (R2) of the concave curve (KK) essentially corresponds to twice the value of the diameter (DKE) of the inscribed largest circle (KE).

10. The drilling tool according to one of claim 1, wherein the radius of curvature (R3) of the convex duct bulging section (AKA) essentially corresponds to 1.5 times the smallest radius of curvature (R1) in the cross sectional contour section BQ1.

11. The drilling tool according to one of claim 1, wherein at least sections of the main blade are concave in design extending from the cutting edge.

12. The drilling tool according to one of claim 1, wherein the main blade has an inflection point in the area of transition to the central blade section.

13. The drilling tool according to one of claim 1, wherein the cooling duct empties partially into the free surface and into a base of the point thinning.

14. The drilling tool according to claim 1, characterized by a configuration as a tool for drilling into solid materials.

* * * * *

UNITED STATES PATENT AND TRADEMARK OFFICE
CERTIFICATE OF CORRECTION

PATENT NO. : 9,636,756 B2
APPLICATION NO. : 14/847471
DATED : May 2, 2017
INVENTOR(S) : Christine Riester It is certified that error appears in the above-identified patent and that said Letters Patent is hereby corrected as shown below:

In the Claims

Column 5, Line 61, Claim 1:
Please change: "hit is formed in each drill web, and the cooling duct has the" to
-- bit is formed in each drill web, and the cooling duct has the --

Column 6, Line 37, Claim 5:
Please change: "The drilling tool according to one of claim 1, wherein" to
-- The drilling tool according to claim 1, wherein --

Column 6, Line 46, Claim 7:
Please change: "The drilling tool according to one of claim 1, wherein" to
-- The drilling tool according to claim 1, wherein --

Column 6, Line 50, Claim 8:
Please change: "The drilling tool according to of claim 1, wherein the" to
-- The drilling tool according to claim 1, wherein the --

Column 6, Line 59, Claim 10:
Please change: "The drilling tool according to one of claim 1, wherein" to
-- The drilling tool according to claim 1, wherein --

Column 6, Line 64, Claim 11:
Please change: "The drilling tool according to one of claim 1, wherein" to
-- The drilling tool according to claim 1, wherein --

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,636,756 B2

Column 7, Line 1, Claim 12:
Please change: "The drilling tool according to one of claim 1, wherein" to
-- The drilling tool according to claim 1, wherein --

Column 7, Line 4, Claim 13:
Please change: "The drilling tool according to one of claim 1, wherein" to
-- The drilling tool according to claim 1, wherein --